United States Patent [19]

Duesler, Jr. et al.

[11] Patent Number: 5,195,384

[45] Date of Patent: Mar. 23, 1993

[54] ENVIRONMENTAL STRESS SCREENING DEVICE TRANSFER APPARATUS

[76] Inventors: Ira D. Duesler, Jr., 14 Walnut St., Mohawk, N.Y. 13407; Thomas P. Harney, Jr., 62 John St., Ilion, N.Y. 13357

[21] Appl. No.: 646,416

[22] Filed: Jan. 28, 1991

[51] Int. Cl.$^5$ ............................................ G01M 19/00
[52] U.S. Cl. .................................................... 73/865.6
[58] Field of Search ..................... 73/865.6; 324/158 F; 374/45, 55, 57; 165/61, 65

[56] References Cited

U.S. PATENT DOCUMENTS

| 4,729,246 | 3/1988 | Melgaard et al. | 374/57 |
| 4,812,750 | 3/1989 | Keel et al. | 73/865.6 |
| 4,860,602 | 8/1989 | Hines et al. | 73/865.6 |

FOREIGN PATENT DOCUMENTS

| 0039573 | 3/1985 | Japan | 374/45 |
| 0619828 | 8/1978 | U.S.S.R. | 73/865.6 |

Primary Examiner—Robert Raevis

[57] ABSTRACT

The disclosed shuttle apparatus provides for the transfer back and forth from compartment to compartment, electronic devices being environmentally stress tested in a multi-compartment environmental chamber of at least three compartments where the temperature in each adjacent compartment is of the opposite temperature extreme. The compact design of the environmental chamber makes it conductive to the small and medium size manufacturer for use in production assembly lines to eliminate latent defects in components and manufacturing processes contained in assemblies. The transfer is completed by activating a pneumatic cylinder to move the shuttle table. As each transfer is completed, doors affixed to the shuttle table form a seal with the door frame of each compartment thereby insulating each compartment's temperature from that of the other. The door and table assembly allows for the user to quickly load and unload electronic devices, subassemblies, and assemblies and/or their carriers. The door and table assembly can also be removed from the stress chamber by the user for reconfiguration to suit a greater variety of applications, thus, expanding the usefulness of the stress chamber and eliminate the need for additional specialized and costly equipment.

4 Claims, 5 Drawing Sheets

ENVIRONMENTAL STRESS SCREENING DEVICE TRANSFER APPARATUS

BACKGROUND OF THE INVENTION

The invention relates to a universal and generic system of environmental stress screening (ESS) of electronic devices such as printed wiring board assemblies. The devices are placed in a chamber and are temperature cycled at high and low limits. The temperature cycling causes stress in the electronic devices and serves to identify weak and defective mechanical joints, such as solder joints, in the components prior to being shipped to the customer. It is essential to note that environmental stress screening (ESS) is not a test for electronic devices but a stressing of electronic devices to weed out weak and defective components. Testing of the devices must take place both before and after environmental stress screening (ESS) to identify those devices that were forced to failure.

In prior chambers, stress screening was performed in chambers that limited quantity or transition rates between temperature extremes. The need for greater reliability and quality has increased and it has become common for stress screening to be performed in a more efficient and cost effective manner. As a result a chamber for production oriented environmental stress screening (ESS) that can stress devices as part of production line processes is required. Large chambers have been developed that are not adaptable or economically feasible for small to medium volume manufacturers, such as the Environmental Stress Screening Apparatus of Keel, et al, U.S. Pat. No. 4,812,750, for high production manufacturers. Small specialized chambers also have been designed to stress screen semiconductor devices, such as the Thermal Stress Screening System of Lesley, et al, U.S. Pat. No. 4,854,726. A need for small, highly efficient, affordable, and convertible ESS chambers exists for those manufacturers whose volume of business does not justify large capital outlay but whose market requires high quality goods.

This invention provides a means for the small to medium volume manufacturer to stress all electronic devices at a justifiable cost and allows for relatively simple reconfiguration to accommodate a variety of devices.

SUMMARY OF THE INVENTION

The invention is a mechanism to transfer electronic devices between a multi-compartment environmental stress chamber consisting of a minimum of three compartments configured to be a high temperature compartment adjacent to a low temperature compartment adjacent to a high temperature compartment, etc. The devices are subjected to a rapid change of temperature thermally stressing the electronic components while they are positioned in each chamber. As the transfer apparatus is moved from compartment to compartment the components are subjected to the opposite temperature extreme. Devices are positioned for a predetermined period of time (operator selected) in the high temperature compartment and are moved to the adjacent low temperature compartment and devices in the low temperature compartment are moved to an adjacent high temperature compartment simultaneously with the movement of the transfer shuttle apparatus. A unique seal is positioned on the doors of the transfer shuttle apparatus to provide an insulated closure between the high and low temperature compartments. An access door is provided above the compartment for loading and unloading devices. The compartments and the transfer shuttle apparatus are made inoperable while the access door is open.

The transfer shuttle is moved from compartment to compartment by means of a pneumatic cylinder actuated by a solenoid valve and compressed air. The said solenoid is actuated by an electronic timer set to a predetermined time per cycle. An electronic counter will be set to a predetermined number of cycles. At the end of the predetermined number of cycles the system will shut down.

At any given time at least one compartment is unoccupied by the shuttle transfer apparatus. The normal function of this compartment is idled until such time the shuttle transfer apparatus is cycled back into this compartment.

The controller logic section of the system may be controlled by the operator and selectively used as an environmental chamber through the use of option switches. With this option selected the compartment's shuttle operation is defeated.

DESCRIPTION OF THE INVENTION

Figure 1:
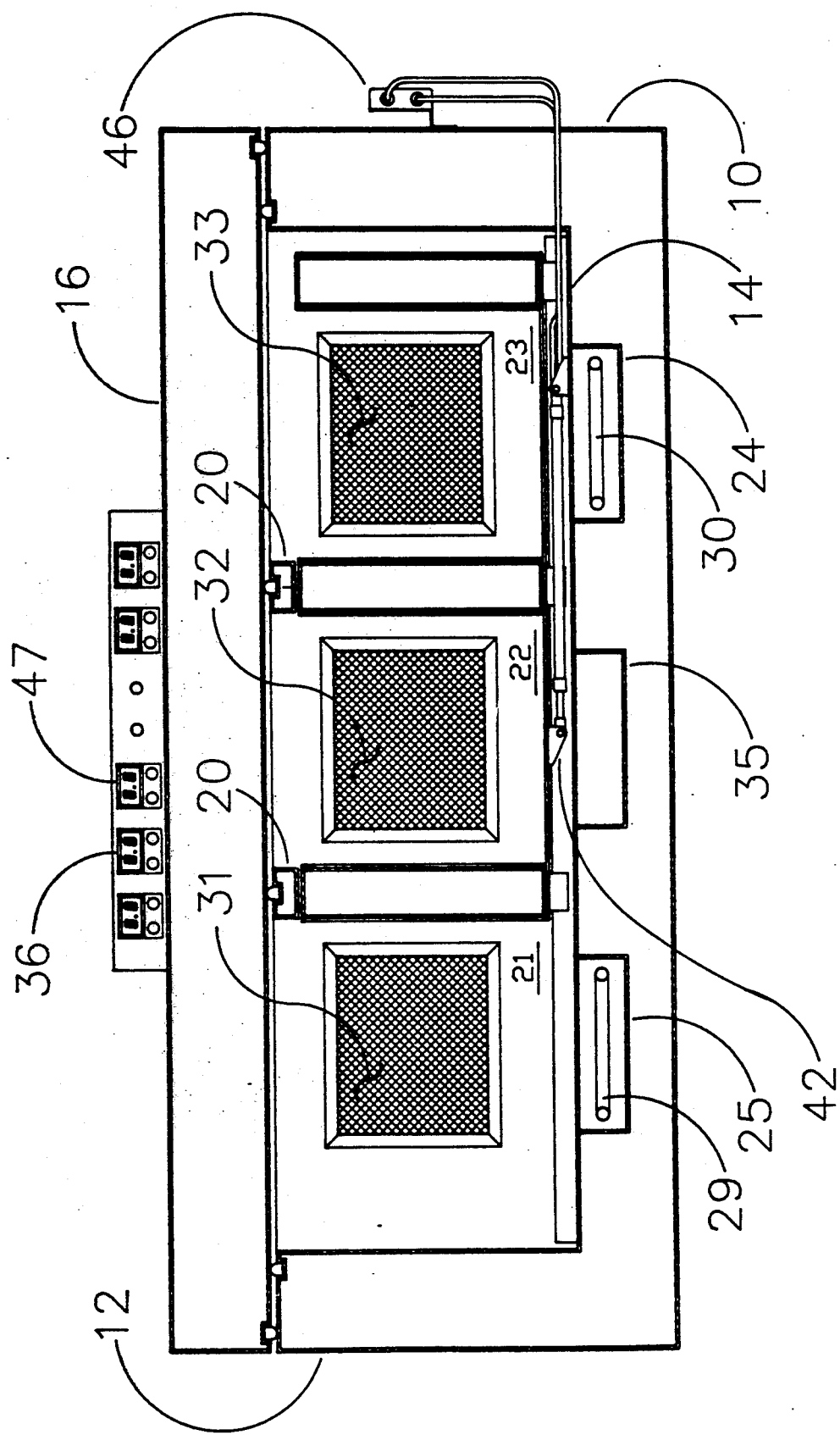
FIG. 1 is a front sectional view of a three compartment environmental stress screening chamber showing the shuttle transfer apparatus in place.
Figure 2:
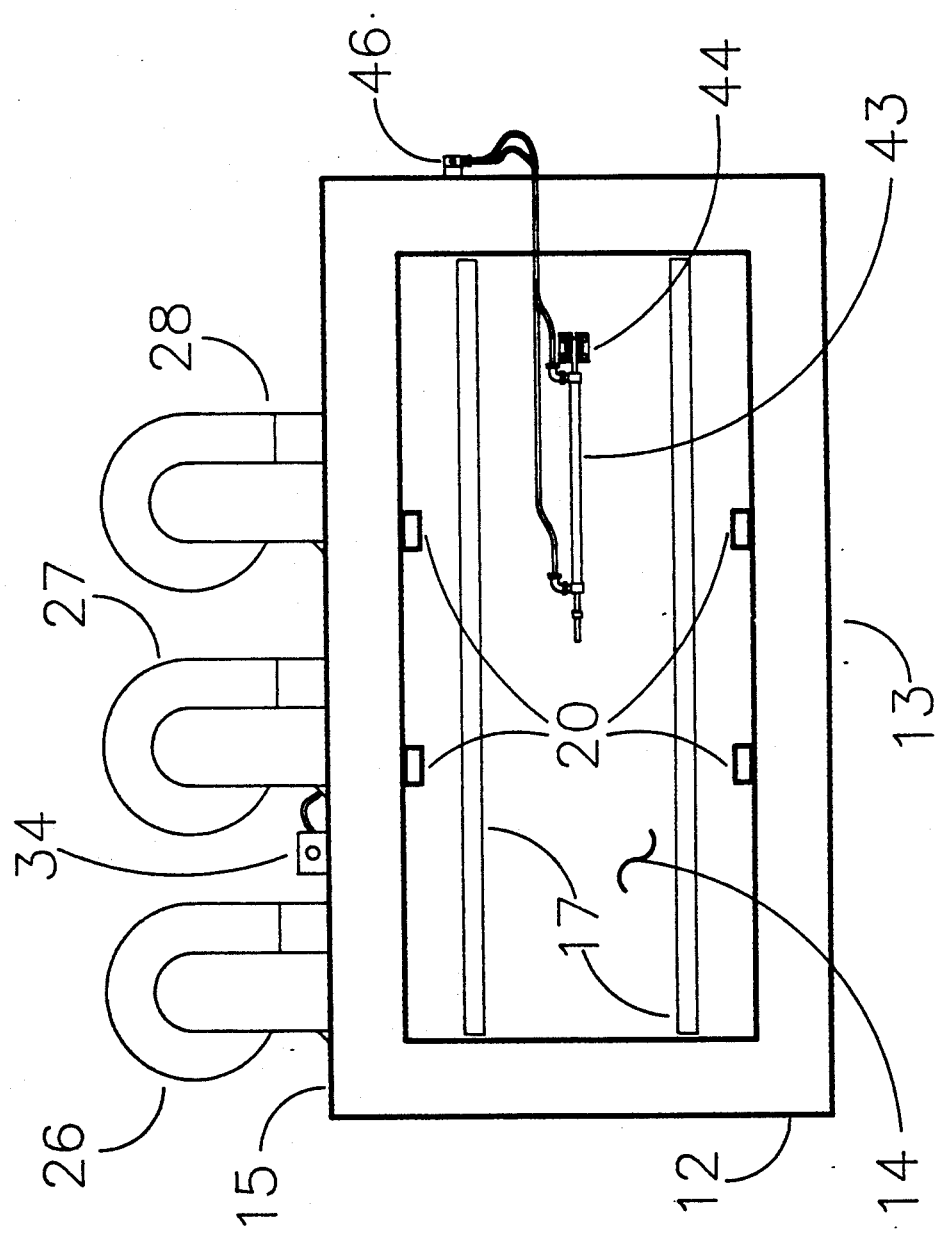
FIG. 2 is a top sectional view of the three compartment environmental stress screening chamber with the shuttle table of the transfer apparatus removed to show the location of the pneumatic cylinder and guide rails.

Referring to the drawings and in particular to FIG. 1, there is an insulated chamber with three compartments 10 having means for controlling the chamber's internal temperature between predetermined limits. The chamber is in essence an insulated box having a pair of end walls 12, a front wall 13, a rear wall 15, and a floor 14. The top of the chamber is closed by a full width, full length insulated hinged door 16 forming an appropriate seal so as to separate each compartment from the other compartment. The floor 14 is provided with a pair of parallel spaced guide rails 17 as seen in FIG. 2. The entire chamber 10 is supported by any appropriate means. Within the chamber 10 the compartments are divided by door frames 20 placed such that three substantially equal sized compartments are formed.

As shown in FIG. 1 and FIG. 2, the high temperature compartment 23 is heated to a predetermined temperature by means of a heating element 30 located within a duct 24 at the output plenum of a blower 28 which in turn moves air through the duct 24 to an output plenum within the compartment 23. The air is pulled through the compartment 23 and across the electronic devices by the blower 28 at which time the air enters an input plenum 33 and is recirculated through the heated duct 24 at a rate sufficient to subject the devices to thermal stress by ramping the temperature up at a maximum rate of 20 C. per minute. The compartment 23 temperature is controlled by a thermal sensing device located within the input plenum of said blower 28 and operates in conjunction with an electronically programmable temperature controller 47.

A compartment 21 functions substantially similar to that of said compartment 23 when the electronically programmable controllers activate said compartment 21.

The low temperature compartment 22 is cooled to a predetermined temperature by injecting liquid carbon dioxide ($CO_2$) into the output plenum of a blower 27 via an orifice in a nozzle and activated by a cryogenic valve 34. The cooled gas in turn moves through a duct 35 to an output plenum within the compartment 22. The gas is then pulled through the compartment 22 and across the electronic devices by the said blower 27 at which time the cooled gas enters an input plenum 32 and is recirculated through the cooled duct 35 at a rate sufficient to subject the devices to thermal stress by ramping the temperature down at a maximum rate of 20 C. per minute. The compartment temperature is controlled by a thermal sensing device located within the input plenum 32 of the said blower 27 and operates in conjunction with an electronically programmable temperature controller 36.

Figure 3:
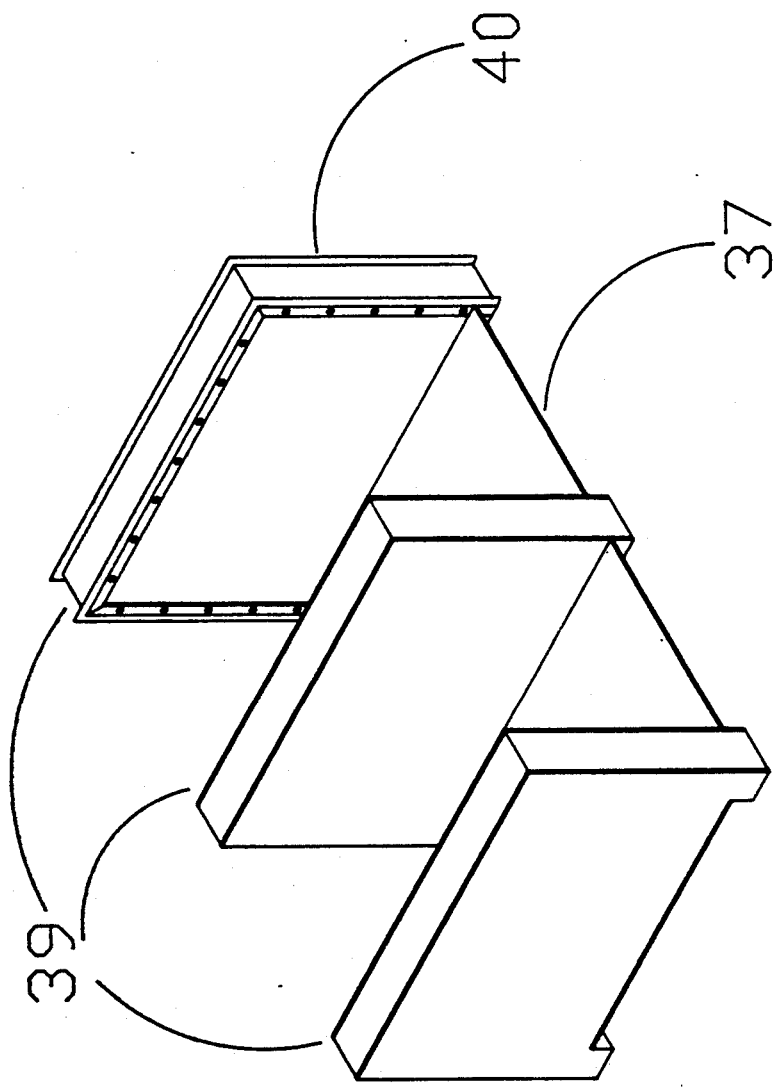
FIG. 3 is a perspective view from above of the shuttle table showing the location of the doors used to separate the three compartments of the ESS chamber.
Figure 4:
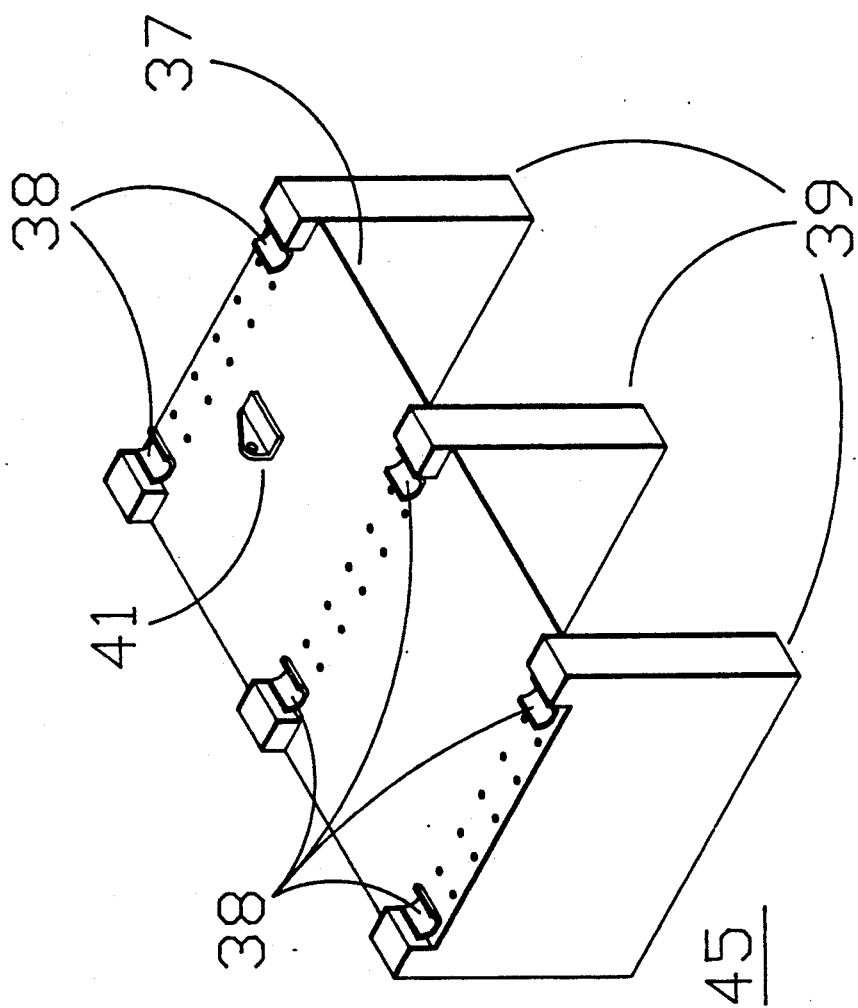
FIG. 4 is a perspective view from below of the shuttle table showing the location of bearings used to attach the shuttle table to the guide rails, the clevis for attaching the pneumatic cylinder rod, and the attachment of the three shuttle doors.
Figure 5:
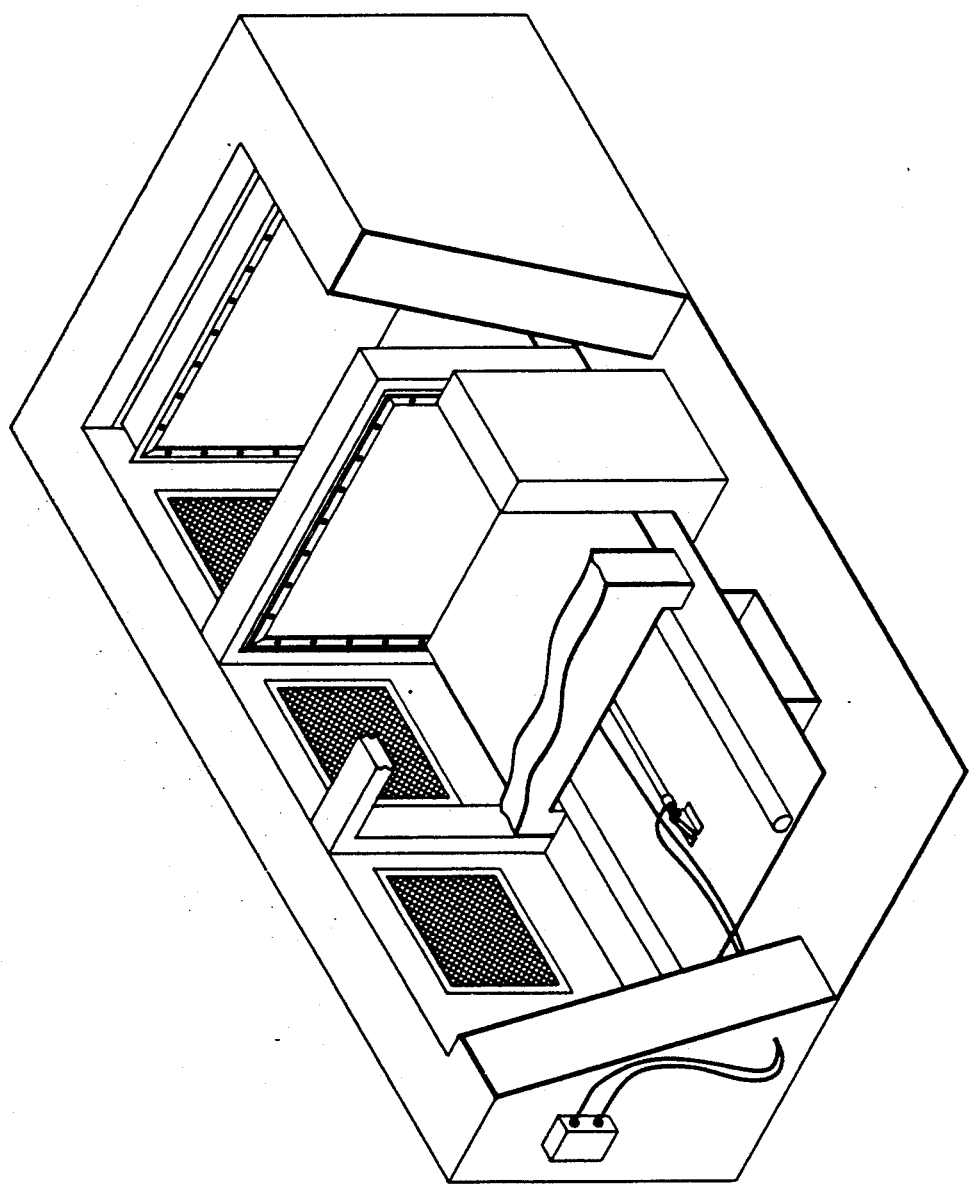
FIG. 5 is a cut away perspective view showing the shuttle transfer apparatus in place in the ESS chamber.

The shuttle apparatus as seen in FIG. 3 and FIG. 4, consists of a rigid table 37 of appropriate size to completely fit within two compartments and is supported by sleeve bearings 38, appropriately placed, of a design such that they will snap over the guide rails 17, shown in FIG. 2, in the floor 14 of the chamber 10 and provide guidance for the table when transferring from compartment to compartment. Because the shuttle transfer apparatus is removable, it enables easy access for repair and replacement of worn parts.

Located at the middle and both ends of the table 37 are doors 39 of an appropriate size to slide through the door frames 20. The doors 39 are of a thickness equal that of the door frames 20 and are insulated so as to form a wall between compartments. The doors 39 are attached to the table by means of appropriate fasteners. All around the outer edges of the doors 39 is located a unique seal 40 that when in contact with the door frame 20 forms an air tight seal so as to segregate each compartment's temperature from that of the adjacent compartment.

On the underneath of the table 37 at one end is attached a bracket 41 to which a clevis 42 from one end of a pneumatic cylinder 43 is attached. Another bracket 44 toward the opposite end is attached to the floor 14 of the chamber 10 to which the other end of the pneumatic cylinder 43 is attached to provide a means by which the table and door assembly 45 is shuttled back and forth between compartments on the guide rails 17 when activated by a solenoid valve 46 and compressed air.

The transfer shuttle apparatus is of such a design as to allow for reconfiguration to accommodate a variety of electronic devices with minimum time and effort. Mounting racks can be fabricated to accommodate any electronic device within the dimensional constraints of the chamber. These mounting racks will be of such a design as to allow for removal from the transfer apparatus and replacement with a like kind to facilitate use of the chamber for different devices.

Many modifications and alterations may be made by persons having ordinary skill in the art without departing from the spirit and scope of the invention. Thus the illustrated embodiment has been set forth only for the purpose of example and should not be taken as limiting the invention which is defined in the following claims.

What is claimed is:

1. An apparatus for environmentally stress screening electronic devices the combination comprising:
    a heat and cold insulated temperature controlled multi-compartment chamber having a substantially open top closed by a full width, full depth access door and door frame, said chamber having a pair of parallel spaced guide rails associated with the floor, said guide rails extend from side to side of the chamber continuously through each compartment;
    a shuttle transfer table to carry electronic devices from said compartment to compartment, said table having parallel doors mounted to act as movable walls to seal temperatures within the compartments, said doors also having a seal that when in contact with the said chamber's door frame will seal the temperature within said compartments, said table also having sleeve bearings carried by said guide rails;
    a pneumatic cylinder mounted beneath said transfer table and between said guide rails and so attached as to allow for said pneumatic cylinder, when actuated with compressed air via a solenoid valve, to move said table from compartment to compartment;
    an electronic timing controller coupled to said solenoid valve electrically activates said solenoid valve causing said transfer table to move from compartment to compartment, completing one cycle;
    an electronic counting controller coupled to the said electronic timing controller counts the number of cycles completed and shuts down the chamber when a programed number of cycles are completed.

2. "The apparatus" now has antecedent basis with amendment of claim 1.

3. "The apparatus" now has antecedent basis with amendment of claim 1.

4. The apparatus according to claim 1 further including any appropriate means to contain electronic devices under test to the walls and/or table;
    a means to further convert said means for use in environmentally stress screening of similar and different electronic devices.

* * * * *